(12) United States Patent
Wolfe et al.

(10) Patent No.: US 6,282,517 B1
(45) Date of Patent: Aug. 28, 2001

(54) REAL TIME COMMUNICATION OF PURCHASE REQUESTS

(75) Inventors: Don P. Wolfe; Douglas S. Nottage, both of Irvine; Kevin J. Waggoner, Rialto; Tim E. Nelson, Pomona, all of CA (US)

(73) Assignee: autobytel.com, Inc., Irvine, CA (US)

( * ) Notice: Subject to any disclaimer, the term of this patent is extended or adjusted under 35 U.S.C. 154(b) by 0 days.

(21) Appl. No.: 09/231,409

(22) Filed: Jan. 14, 1999

(51) Int. Cl.[7] .................................................. G06F 17/60
(52) U.S. Cl. .............................. 705/26; 705/27; 705/28; 705/36
(58) Field of Search ............................ 705/26, 37, 27, 705/28

(56) References Cited

U.S. PATENT DOCUMENTS

| | | |
|---|---|---|
| 5,283,731 | 2/1994 | Lalonde et al. . |
| 5,592,375 | 1/1997 | Salmon et al. . |
| 5,671,279 | 9/1997 | Elgamal . |
| 5,710,887 | 1/1998 | Chelliah et al. . |
| 5,842,178 | 11/1998 | Giovannoli . |
| 5,937,391 | * 8/1999 | Ikeda et al. ............................ 705/14 |

OTHER PUBLICATIONS

Henry, Ed; The virtual Car Buyer; Kiplinger's Personal Finance Magazine; p145–150, Sep. 1995.*
Conhaim, Wallys W.; Buying cars online; Link–Up; v15; n5, Sep. 1, 1998.*
Electronic Marketplace Report, Automotive Sites Missing Web Ad Opportunities; v10; n22, Nov. 19, 1996.*
Interactive Marketing News; Auto–by–Tel Wins Educated Customers and Low Prices; v31; n28, Oct. 18, 1996.*
M2Presswire; What Car? TV limited: What car? Online and What Car? Text boost manufacturer and dealer sales leads, Aug. 31, 1998.*
PR Newswire Page; Autoweb.com's New Risk–Free Pricing Structure Revolutionizes Online Car Buying Industry, Feb. 9, 1998.*
Nauman, Matt; The Virtual Showroom Car Shopping on the Web; San Jose Mercury News, Section: Drive; p12, Feb. 7, 1997.*
PR Newswire; Navidec Inc. Announces Third Quarter Results, Nov. 6, 1997.*

(List continued on next page.)

Primary Examiner—V. Millin
Assistant Examiner—Pedro R. Kanof
(74) Attorney, Agent, or Firm—Knobbe, Martens, Olson & Bear, LLP

(57) ABSTRACT

A method and apparatus for formulating and submitting a purchase request over a computer network and making said purchase request available to a dealer immediately. A Data Center system has a system database, a buyer interface, and a dealer interface. The system database includes an exclusive database region for each participating dealer. A potential buyer submits a purchase request over a computer network to the Data Center system. The purchase request includes a product identification data and a buyer location information. The Data Center system further contains dealer information, product information, and the like. The Data Center system determines at least one appropriate dealer to receive the purchase request. The Data Center creates a purchase request record from the data and information provided in the purchase request. The Data Center then communicates the purchase request to the appropriate dealer by immediately storing the purchase request record into the appropriate dealer's exclusive database region. Thus, the purchase request record becomes immediately available to the appropriate dealer.

33 Claims, 17 Drawing Sheets

OTHER PUBLICATIONS

PR Newswire; Navidec Announces "Wheels" Launch Progress Ahead of Schedule, Oct. 27, 1997.*

Naughton, Keith; Revolution in the Showroom: Finally, consumers are in the driver's seat–and pushy dealers look like dinosaurs; Business Week; n3463; p70, Feb. 19, 1996.*

Business Wire; Lycos and AdOne's ClassifiedWarehouse.com Create Online Alliance . . . ; p1093, Dec. 2, 1998.*

Hickford, Michele;Autoweb.com: Industry Leader Autoweb.com Revolutionizes Online Car . . . , Jan. 31, 1998.*

Washington, Frank S.; Autoweb Plans Major Ad Effort; Automotive News; v71; n5726; p1–6, Aug. 11, 1997.*

Akasie, Jacy; Want to buy a new car?; Forbes; v162; n13; p144–148, Sep. 1995.*

* cited by examiner

EXCLUSIVE DEALER REGIONS RECORD

|  | ZIP CODES | | | |
|---|---|---|---|---|
| V E H I C L E   M A K E | | DEALER IDENTIFICATION NUMBER | ••• | |
| | | | | |
| | DEALER IDENTIFICATION NUMBER | | | |
| | ⋮ | | | |
| | | | | |

*FIG. 2*

NEW VEHICLE RECORD

| VEHICLE MAKE | VEHICLE MODEL | VEHICLE YEAR | VEHICLE TYPE | VEHICLE ESTIMATED PRICE | VEHICLE FEATURES | VEHICLE PHOTO |
|---|---|---|---|---|---|---|
| 402 | 404 | 406 | 408 | 410 | 412 | 414 |

FIG. 4

| DEALER IDENTIFICATION NUMBER | DEALER STOCK NUMBER | VEHICLE MAKE | VEHICLE MODEL | VEHICLE INFORMATION | VEHICLE PHOTO |
|---|---|---|---|---|---|
| 302 | 502 | 504 | 506 | 508 | 510 |

USED VEHICLE RECORD

FIG. 5

DEALER RECORD

| DEALER IDENTIFICATION NUMBER | DEALER INFORMATION | ACCESS LIST | PRODUCT LIST | NEW VEHICLE PURCHASE REQUESTS | USED VEHICLE PURCHASE REQUESTS |
|---|---|---|---|---|---|
| 100001 | BOC OF IRVINE 123 ANY STREET IRVINE, CA. 92612 | BUICK GM, OLDS GM, CADILAC GM, SALESPERSON 1 ... SALESPERSON 2 | BUICK CENTRY, BUICK RIVIERA, OLDSMOBILE CUTLASS, CADILAC SEVILLE, | NEW VEHICLE PURCHASE REQUEST 1 NEW VEHICLE PURCHASE REQUEST 2 ... NEW VEHICLE PURCHASE REQUEST n | USED VEHICLE PURCHASE REQUEST 1 USED VEHICLE PURCHASE REQUEST 2 ... USED VEHICLE PURCHASE REQUEST n |

FIG. 12

| Home | New | Used | Research | Finance | Insur | Warranties | Rewards |

1996 CAR

1 Vehicle located

Select a different make
Select a different model

Scroll down and click for photo & details  1402

1996 Car                                    $29,995
Black — Automatic — 6 cyls                  43,912
2558 mi from 92612

FIG. 14

| Home | New | Used | Research | Finance | Insur | Warranties | Rewards |

The Best Way to Buy a New Car, Online

To fully benefit from Autobytel.com's free service, we ask that you spend a couple of minutes tp prepare before submitting your purchase request. Before starting, please:

- Use the research sectio of this website to narrow your choices.
- Select the make and model you wish to lease or purchase.

Make: Acura

Model: 3.2TL ▶  [GO]  — 1602

Ready to go?

If you've done your reasearch and picked a new Acura to purchase, select a model from this list and click on GO!

Still considering a range of new makes or models?

Maybe a Acura is not the only vehicle you would like to consider. If this is the case, you can ssearch for a new vehicle by broader criteria:

- Browse our new vehicle photo gallery to explore a variety of vehicle similar to Acura.
- Select a new vehicle based upon features like type, mileage, price, etc...

FIG. 16

REAL TIME COMMUNICATION OF PURCHASE REQUESTS

RELATED APPLICATIONS

The present application is related to the co-pending and commonly owned U.S. Patent applications having the following titles and attorney docket numbers, each of which was filed on even date herewith:
1. COMPUTER IMPLEMENTED PURCHASING SYSTEM WITH AVAILABLE INVENTORY MANAGEMENT FUNCTIONS, attorney docket number AUTOB.052A
2. SYSTEM AND METHOD FOR SELECTIVELY RETRIEVING INFORMATION ITEMS, attorney docket number AUTOB.050A
3. COMPUTER IMPLEMENTED PURCHASING SYSTEM WITH AFTERMARKET PRODUCT INVENTORY DISPLAY, attorney docket number AUTOB.047A
4. COMPUTER IMPLEMENTED PURCHASING SYSTEM WITH USER ACCESSIBLE PURCHASE REQUEST STATUS, attorney docket number AUTOB.046A
5. REAL TIME VEHICLE PURCHASE REQUEST MANAGEMENT METHOD AND SYSTEM, attorney docket number AUTOB.043A Each of the above referenced patent applications are incorporated by reference herein in their entireties.

BACKGROUND

1. Field

The present invention is related to systems and methods for conducting transactions using networked computers. Furthermore, this invention relates to communicating a potential customer's purchase request to a seller.

2. Description of the Related Art

The global economy has made the business of selling more competitive than ever. Businesses that do not maximize customer satisfaction and profitability may not survive in today's markets. Businesses are therefore demanding tools and methods to provide a competitive edge.

In a conventional vehicle sales scenario, a potential automobile purchaser initiates a purchasing process by visiting a dealership. The customer may make several preliminary visits before making his or her purchasing intent known to the dealer. Until the purchasing intent is revealed, the dealer acts inefficiently in attempting to consummate a customer purchase.

For example, the dealer maintains potentially unnecessary resources to handle the preliminary visits. Not knowing whether the potential customer intends to make a purchase, a large number of salespersons stand ready to confront all visitors to the dealership. However, many visits are preliminary and do not require the assistance of a salesperson. Accordingly, inefficiency is often experienced in such a conventional vehicle dealership setting.

Moreover, in the conventional vehicle dealership, the salesperson works on a commission basis. Because the salesperson's income is directly related to a vehicle's sales price, the salesperson will attempt to sell a vehicle for the highest price possible while still gulling a customer into thinking the customer is getting a great deal. Haggling over the vehicle's price enables the salesperson to achieve this goal.

Haggling over the vehicle's price is an unpleasant process for the customer. Both the customer and dealer invest significant resources in time and energy in this type of negotiation process. Additionally, the dread and intimidation associated with the haggling process often makes it stressful and frustrating for the customer. The customer may decide not to make a purchase as a result of the unpleasant haggling process. Thus, the haggling process introduces additional inefficiency in the vehicle sales process in the form of excess negotiation effort and potential lost sales.

SUMMARY

The present invention is related to systems and methods for conducting transactions utilizing networked computers. More particularly, this invention relates to communicating a potential customer's vehicle purchase request to a seller.

In conducting a commercial transaction such as the sale of a vehicle, a Data Center system facilitates the creation and submission of a purchase request. The Dalta Center system provides at least a first user web page accessible by a potential buyer. The potential buyer accesses this web page and provides the necessary information needed to create a purchase request.

The buyer provided information is then used to create a new vehicle purchase request record or a used vehicle purchase request record. Both purchase request records contain multiple fields. Each field may additionally contain multiple sub-fields or may even point to other fields or records. The purchase request record contains buyer and product information such as buyer contact information, product description, and payment information.

The purchase request record is stored in a Data Center system database. In one embodiment, the Data Center system database may be partitioned into exclusive database regions. Each participating seller may be assigned an exclusive database region. In another embodiment, a seller record may advantageously exist for each, seller, and the seller record contains information associated with the particular seller. For example, the seller record can contain or point to the seller's purchase request: records. Here, the collection of all records associated with the seller advantageously comprises a virtual exclusive database region in the Data Center system database. The Data Center system database further contains information regarding, for example, sellers, exclusive seller regions, and available products.

When a potential buyer submits either a new vehicle purchase request or a used vehicle purchase request, the Data Center system invokes program modules such as, by way of example, a buyer access module, to create an appropriate purchase request record. Moreover, the Data Center system identifies and notifies an appropriate seller of the purchase request. In one embodiment, the purchase request record is stored in the appropriate seller's exclusive database region. In another embodiment, the seller record may advantageously point to the purchase request record. Thus, the seller immediately becomes aware of the purchase request upon the creation of the purchase request record. In an alternative embodiment, the Data Center system may identify and notify one or a plurality of sellers of the purchase request. Here, the purchase request record may be stored in each identified seller's exclusive database region.

For a new vehicle purchase request, the appropriate seller is advantageously determined by exclusive seller regions based on vehicle make and zip code. For a used vehicle purchase request, the vehicle description generally determines the appropriate seller or sellers.

In one embodiment of the invention, the potential buyer accesses the Data Center system user web pages to submit the purchase request. The Data Center system may assist the buyer in formulating the purchase request. For example, the Data Center system may prompt the buyer to provide the information necessary to create the purchase request.

The Data Center receives the purchase request information from the buyer and determines an appropriate seller to receive the purchase request. The Data Center then proceeds to create and store the appropriate purchase request record in the database; region exclusively assigned to the seller. In one embodiment, the newly created purchase request record may be virtually stored in the seller's exclusive database region by associating or linking the purchase request record to the appropriate seller record.

The present invention facilitates a real time communication of a purchase request to a seller. The real time communication is accomplished by creating the purchase request record in the seller's exclusive database region. As aforementioned, the exclusive database region may either be physically created or virtually created. The real time communication of the purchase request to the seller occurs upon the creation of the purchase request record in its exclusive database region. The seller becomes aware of the newly created purchase request immediately upon the creation of the purchase request record.

In one example, a seller A may be accessing its exclusive database region via a network. Concurrently, a potential buyer may submit a purchase request to the Dalia Center. The Data Center system may determine seller A as the seller to receive the purchase request and accordingly, create a purchase request record in seller A's exclusive database region. This is analogous to the buyer submitting the purchase request by directly writing into the seller=3 s exclusive database region. Immediately upon the purchase request record's creation, seller A becomes aware of the newly created purchase request because the seller has direct access to its exclusive database region. In one embodiment, Seller A's computer screen may be immediately refreshed to reflect the newly created purchase request. In another embodiment, Seller A may be notified via communication mechanisms such as e-mail, page, telephone message, or the like.

Thus, in contrast to conventional systems, the seller is made aware of a new purchase request without significant processing delay. Moreover, the seller may 5 efficiently and advantageously act upon the purchase request in real time.

BRIEF DESCRIPTION OF THE DRAWINGS

These and other aspects, advantages, and novel features of the invention will become apparent upon reading the following detailed description and upon reference to accompanying drawings in which:

FIG. 2 is a representation of one embodiment of an exclusive dealer regions record of the invention;

FIG. 4 is a representation of one embodiment of a new vehicle record of the invention;

FIG. 5 is a representation of one embodiment of a used vehicle record of the invention;

FIG. 12 is a representation of one embodiment of a dealer record showing the contents of the record fields;

FIG. 14 is a representation of one embodiment of a web page containing a hypertext link;

FIG. 16 is a representation of one embodiment of a web page suitable for use in the new vehicle purchase request creation and submission process.

DETAILED DESCRIPTION

Figure 1:
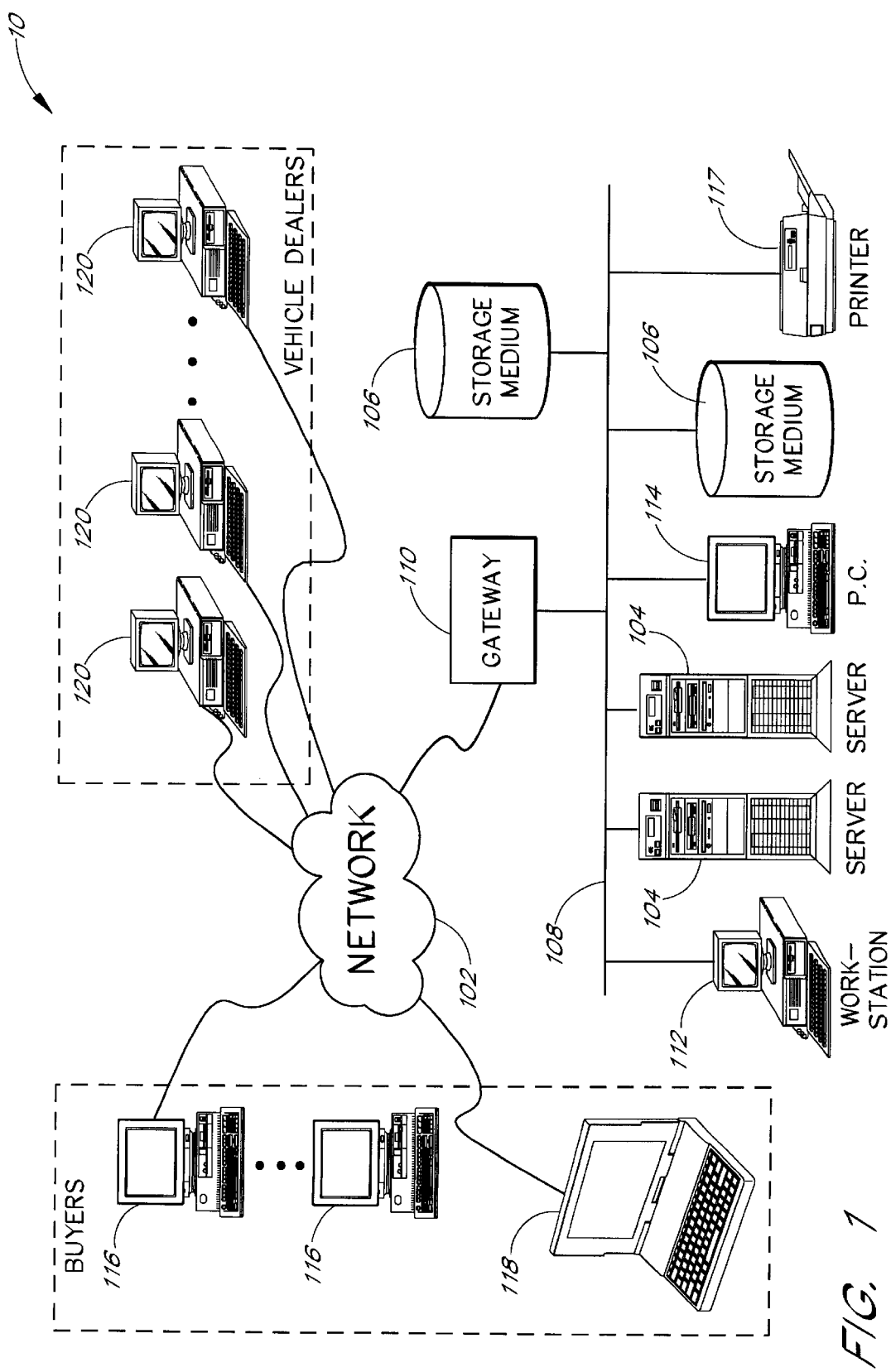
FIG. 1 is a system block diagram illustrating an embodiment of the overall network architecture of the invention.

In one embodiment of the invention, a computerized purchase request communication system is provided which facilitates a real time communication of a purchase request to a system determined seller. The system includes a plurality of HTML pages accessible over a network. A potential buyer accesses a first HTML web page over a network such as the World Wide Web (www) using a standard web browser. A participating seller accesses a second HTML page over a network advantageously utilizing a standard web browser and by providing a URL to identify the system. The system further comprises a web server and other program modules which enable direct and immediate access into a system database. As used herein, "immnediately" is understood to mean occurring without loss or interval of time other than the nominal delay necessarily caused by computing components such as microprocessors, memory devices, software and firmware program execution times, and the like.

A participating seller is a seller of goods which has entered into an agreement to participate in the computerized purchase request communication system of the invention. The seller is identified by a unique seller record stored in the system database. The seller is further assigned an exclusive database region in the system database. The seller directly accesses its exclusive database region over the network utilizing the system's HTML pages.

The system creates exclusive sales regions based on geographic zip code and product type. Each participating seller is then assigned one or a plurality of exclusive sales regions depending on the agreement entered into by the seller. As an example, a seller X may be assigned the exclusive sales region encompassing the zip code 12345 for product A. Then, all purchase requests for product A identified as originating in zip code 12345 will be communicated to seller X. In an alternative embodiment, one or a plurality of sellers may be assigned to a single sales region. Thus, a purchase request may be sent to the plurality of sellers.

A potential buyer utilizes the plurality of buyer web pages comprising the system to create a purchase request. The system determines an appropriate seller to receive a purchase request based upon certain information supplied by the buyer. Having determined an appropriate seller, the system immediately stores the purchase request in the appropriate seller's exclusive database region. It is as if the potential buyer directly created the purchase request in the seller's exclusive database region.

The participating seller utilizes the plurality of HTML pages comprising the system to directly access the seller's exclusive database region. The system facilitates direct, concurrent access of the exclusive database region through both the buyer web pages and the seller HTML pages. As an example, the system may store the purchase request into a seller's exclusive database region immediately upon the creation and submission of the purchase request irrespective of whether the seller is concurrently accessing its exclusive database region. If the seller is accessing its exclusive database region, the seller is immediately made aware of the newly created purchase request. If the seller is not currently accessing the system, by immediately storing the just created purchase request in the seller's exclusive database region, and because the seller may directly access its database region, the system communicated the purchase request in real time.

Even though the invention is suitable for communicating a purchase request for any product, the invention will be further disclosed in the context of communicating a purchase request for a vehicle in a vehicle sales environment. Throughout the drawings, components which correspond to components shown in previous figures are indicated using the same reference numbers.

In one embodiment of the invention, a Data Center system facilitates the sales process by informing a vehicle dealer, in real-time, of a potential buyer. The Data Center system utilizes a database to store dealer information, buyer information, and program logic, for example, to associate the potential buyer to a specific dealer. Additionally, the Data Center system may include program logic facilitating access between the Data Center system and sources external to the Data Center system over a computer network.

Computer networks suitable for use with the present invention include local area networks (LAN), wide area networks (WAN), Internet, or other connection services and network variations such as the world wide web, the public internet, a private internet, a private computer network, a secure internet, a private network, a public network, a value-added network, and the like. The computers connected to the network may be any microprocessor controlled device that permits access to the network, including terminal devices, such as personal computers, workstations, servers, mini computers, main-frame computers, laptop computers, mobile computers, palm top computers, hand held computers, set top box for a TV, or a combination thereof. The computers may further possess input devices such as a keyboard or a mouse, and output devices such as a computer screen or a speaker. The computer network may include one or more LANs, WANs, Internets, and computers. The computers may serve as servers, clients, or a combination thereof.

One network architecture which may be used with one embodiment of the invention is indicated generally by a system 10 in FIG. 1. The system 10 may include a network 102, which represents a computer network as previously described, providing access to and from the Data Center system.

In one embodiment of the invention, the Data Center programs and Data Center databases comprising the Data Center system preferably reside on one or more Data Center servers 104 and one or more Data Center storage mediums 106. The Data Center servers 104 and Data Center storage mediums 106 may be interconnected by a LAN 108 and a gateway 110 to the network 102. The gateway 110 facilitates access to the Data Center system from the network 102.

One example of the LAN 108 may be a corporate computing network, including possible access to the Internet, to which computers and computing devices comprising the Data Center system are connected. In one embodiment, the LAN 108 conforms to the Transmission Control Protocol/Internet Protocol (TCP/IP) industry standard. In alternative embodiments, the LAN 108 may conform to other network standards, including, but not limited to, the International Standards Organization's Open Systems Interconnection, IBM's SNAG®, Novell's Netware®, and Banyon VINES®.

Those of ordinary skill in the art will recognize that the Data Center programs, the Data Center databases, and gateway functionality may advantageously be implemented on one or more computers. These computers may be uniprocessor or multiprocessor machines. Additionally, these computers include an addressable storage medium such as random access memory and may further include a non-volatile storage medium such as a magnetic or an optical disk.

In accordance with one embodiment of the invention, the Data Center server 104 is connected to the Internet and utilizes at least a first user web page remotely accessible by a potential buyer. This user web page permits the potential buyer to enter the necessary buyer and product information into the Data Center system. In another embodiment, the Data Center server 104 utilizes a second HTML page accessible by an authorized dealer. The authorized dealer utilizes this web page to access the Data Center system and features as further detailed herein. Those of ordinary skill in the art will recognize that a single web page may be used to provide both remote buyer and dealer access to the Data Center system. Further, access for a remote buyer could be through an entirely different network than that used for access by the dealer.

In one embodiment, the Data Center storage medium 106 may be configured as a database from which information can be both stored, updated, and retrieved. For example, the database may conform to the SQL standard. In an alternative embodiment, the database may conform to any database standard, or may even conform to a non-standard, private specification. The Data Center programs may provide access to the information stored on the Data Center storage medium 106. The Data Center storage medium 106 may be accessed by devices such as clients, servers, workstations, personal computers, and the like, connected to the network 102 or the LAN 108.

In one embodiment, the Data Center storage medium 106 comprises exclusive database regions. The Data Center assigns each participating dealer an exclusive database region. In another embodiment, the exclusive database regions may be created by segmenting the storage media into distinct areas, with each area assigned to a dealer. These areas or regions could be dynamically allocated by the computer depending on the amount of data to be stored as the data is entered. In another embodiment, the collection of information associated with a dealer advantageously comprises the exclusive database region for the dealer. The exclusive database region may only be accessed by the assigned dealer and the Data Center system programs.

In another embodiment, the Data Center programs may transfer the information stored on the Data Center storage medium 106 to sources external to the Data Center system. For example, vehicle inventory information may advantageously be transferred to other third-party computers connected to the network 102. A potential buyer can then access the third-party computer to view vehicle data. In yet another embodiment, the potential buyer may also submit a vehicle purchase request from the third-party computer.

Various other devices may be connected to the LAN 108. For example, a workstation 112 and a personal computer 114 may be connected to the LAN 108 to provide access to the Data Center programs and Data Center databases. In one embodiment, a printer 117 may also be connected to the LAN 108 providing local and remote printing capabilities.

The network 102 may connect devices, such as a user computer 116 or a user laptop 118, for example, by use of a modem or by use of a network interface card. As illustrated, potential buyers, may utilize such devices to remotely access the Data Center system via the network 102. The device used to provide access to the Data Center server may be referred to herein as a buyer terminal. This term is intended to include any device useful for providing access to the Data Center. The Data Center stores the purchase request directly into a dealer's database region.

A plurality of dealer computers 120 may also be connected to the network 102 through a modem or other network connection device. A vehicle dealer may advantageously use the dealer computer 120 to remotely access the Data Center system. The device used to provide access to the Data Center server may be referred to herein as a dealer terminal. This term is intended to include any device useful for providing access to the Data Center. The dealer obtains entry into the Data Center by logging in through the second HTML page of the Data Center server 104. Upon logging in, the dealer attains direct access to its exclusive database region and the contents thereof. Moreover, because a purchase request is directly stored in a dealer's database region, the dealer is immediately made aware of any newly created purchase request.

Although particular computer systems and network components are shown, those of ordinary skill in the art will appreciate that the present invention also works with a variety of other networks and components.

In one embodiment, for new vehicle sales, each zip code is an exclusive territory for a given make of vehicle. Thus, a particular dealer is advantageously assigned an exclusive sales region based upon a vehicle make and a zip code. If a new vehicle purchase request is submitted, for example, for a vehicle make A in zip code 99999, then the dealer assigned to zip code 99999 for the vehicle make A will be notified of the new vehicle purchase request. In one embodiment, a particular dealer may be assigned multiple vehicle makes as well as multiple zip codes. In another embodiment, sales regions need not be based upon zip codes. Other factors such as, by way of example, telephone area codes, cities, and counties, may advantageously provide the basis for determining sales regions.

In an alternative embodiment, one or a plurality of dealers may be assigned to a single sales region. Here, if a new vehicle purchase request is submitted, for example, for a vehicle make B in a zip code 88888, then the plurality of dealers assigned to zip code 88888 for vehicle make B will all be notified of the new vehicle purchase request.

For used vehicles, the territories are advantageously not exclusive. The dealer and buyer may separately specify a search radius. For example, each dealer may specify a search radius indicating that the dealer's used vehicles are to be offered for sale to potential buyer's within the specified geographic radius from the dealer location. This could be done, for example, by utilizing zip codes to represent the area from which the dealer would accept buyers. Similarly, the buyer may specify a search radius indicating the desire to purchase a used vehicle from a dealer within the specified geographic radius from the buyer location. Thus, both the buyer's and the dealer's search radius must overlap before a potential vehicle match is considered.

The dealer and the buyer may simply specify large geographic regions, such as states, counties, or zip codes, and only those dealers and buyers within the geographic region specified by both are considered to determine a potential vehicle match. Thus, if a dealer specifies New York and New Jersey as its sales region and a buyer accesses the Data Center from Pennsylvania, then the dealer's used vehicles would not be considered for a potential sale. Likewise, if a buyer specifies an intent to purchase from New York, a Texas dealer will not be considered.

FIG. 2 illustrates an example of a record of exclusive dealer regions suitable for use with one embodiment of the invention. Advantageously, the record of exclusive dealer regions may be implemented as a matrix. The matrix may be stored in the Data Center Storage medium 106. Along the horizontal axis may be listed all the regions according to zip codes. Along the vertical axis may be listed all the available vehicle makes. Each matrix cell 202 may contain a dealer identification number uniquely identifying a dealer. In this manner, each region, and each vehicle make for that region, may be assigned to a unique dealer. In an alternative embodiment, each matrix cell 202 may contain one or a plurality of dealer identification numbers.

Figure 3:
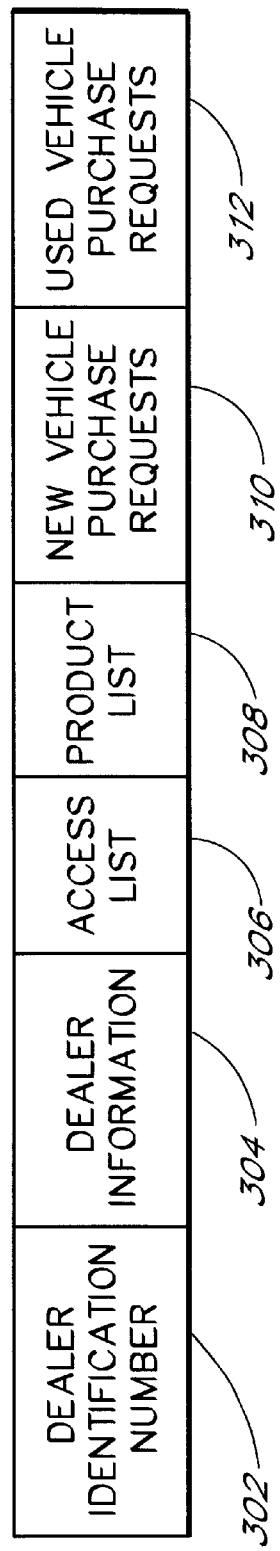
FIG. 3 is a representation of one embodiment of a dealer record of the invention.

FIG. 3 illustrates an example of a dealer record according to one embodiment of the invention. Each dealer eligible to sell through the Data Center system is assigned a dealer record. The dealer record may be stored in the dealer's exclusive database region in the Data Center storage medium 106. By way of example, six fields are illustrated comprising the dealer identification number 302, dealer information 304, access list 306, product list 308, new vehicle purchase requests 310, and used vehicle purchase requests 312. One of ordinary skill in the art will realize that any number of the fields may be broken down into additional sub-fields and that additional fields could be added.

Figure 13:
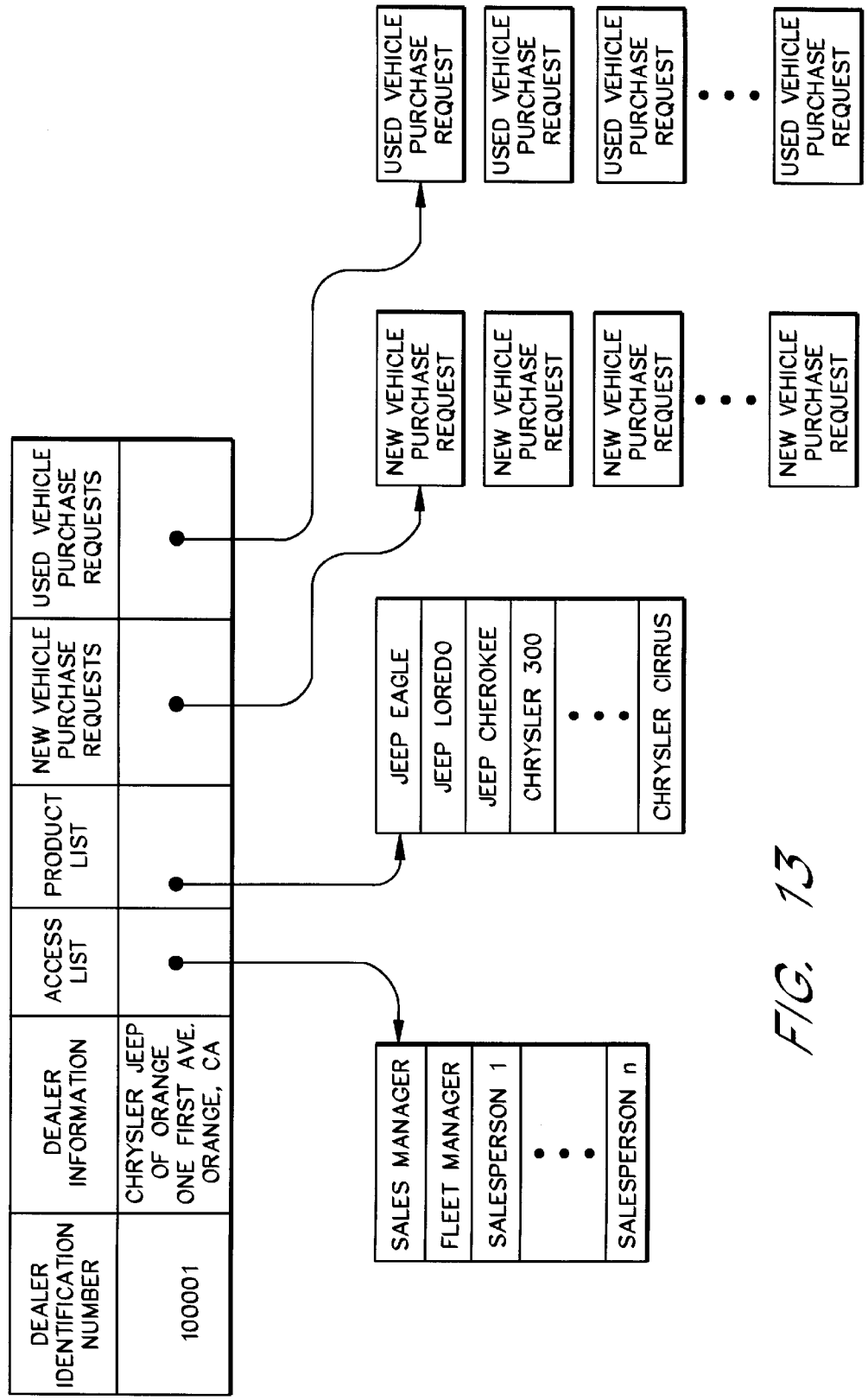
FIG. 13 is a representation of one embodiment of a dealer record showing certain of the fields implemented as pointers.

In one embodiment, the dealer information 302 may be comprised of additional fields such as, for example, a dealer name, dealer address, dealer group, and the like. FIG. 12 generally illustrates an example of a dealer record showing the contents of the record fields suitable for use with one embodiment of the invention. Furthermore, any of the dealer record fields may be implemented as pointers to other fields or other data records. For example, the product list may point to a list of new vehicle model records indicating the new vehicle models offered for sale by the dealer. FIG. 13 generally illustrates an example of a dealer record depicting certain of the fields implemented as pointers.

In one embodiment, each new vehicle model record may in turn point to a list of aftermarket product records. The aftermarket product records identify additional products offered for sale, by the dealer, for the specific new vehicle model. The aftermarket product record may be comprised of the name of an aftermarket product, a retail price for the product, a discounted price for the product, and possibly a photo showing the product.

In yet another embodiment, each new vehicle model record may further point to a vehicle model specifics record and a vehicle model accessories record. The vehicle model specifics record may identify the vehicle model specifics such as available transmission type, available number of doors, and the like. The vehicle model accessories record may identify the accessories such as leather seats, power windows, and the like, available for the vehicle model. In an alternative embodiment, the vehicle model specifics record contents and the vehicle model accessories record contents may be appropriately displayed in a web page. The buyer may then specify the desired vehicle specifics and the desired vehicle accessories.

In one embodiment, a new vehicle database may be comprised of a list of new vehicle records which may be stored in the Data Center storage medium 106. Each new vehicle model available for purchase through the Data Center system is associated with a new vehicle record. FIG. 4 illustrates a new vehicle record suitable for use with the invention. Seven fields are illustrated comprising a vehicle make 402, vehicle model 404, vehicle year 406, vehicle type 408, vehicle estimated price 410, vehicle features 412, and vehicle photo 414. It should be understood that appropriate fields may be added and a field may contain additional sub-fields. For example, the vehicle features field 412 may advantageously be comprised of a standard features field and an optional features field. In one embodiment, the vehicle type field 408 may specify whether the vehicle is a passenger car, a luxury car, a sports car, or the like.

In another embodiment, the new vehicle record fields may be implemented as pointers to other fields or other records. For example, the vehicle photo field 414 may be implemented as a pointer pointing to a representative photo of the new vehicle. Thus, the representative photo may advantageously be stored in a different region in the Data Center storage medium 106. In yet another embodiment, the vehicle year field 406 may be implemented as a pointer pointing to one or a plurality of records, each record containing, for example, a year field, a type field, an estimated price field, a features field, a photo field, and the like.

A used vehicle record identifies a used vehicle, and is created for each used vehicle offered for sale through the Data Center system. The collection of used vehicle records comprise a used vehicle inventory. The used vehicle records may be stored in the Data Center storage medium 106. For example, the used vehicle inventory may be comprised of a linked list of used vehicle records.

FIG. 5 illustrates an example of a used vehicle record suitable for use with one embodiment of the invention. Six fields are illustrated comprising the dealer identification number 302, a dealer stock number 502, vehicle make 504, vehicle model 506, vehicle information 508, and vehicle photo 510. One of ordinary skill in the art will realize that appropriate fields may be added and any number of the fields may be broken down into additional sub-fields. Furthermore, any of the fields may be implemented as pointers to other fields or other data records. For example, the vehicle photo field 510 may advantageously point to an image of the vehicle stored elsewhere in the Data Center database.

Figure 6:
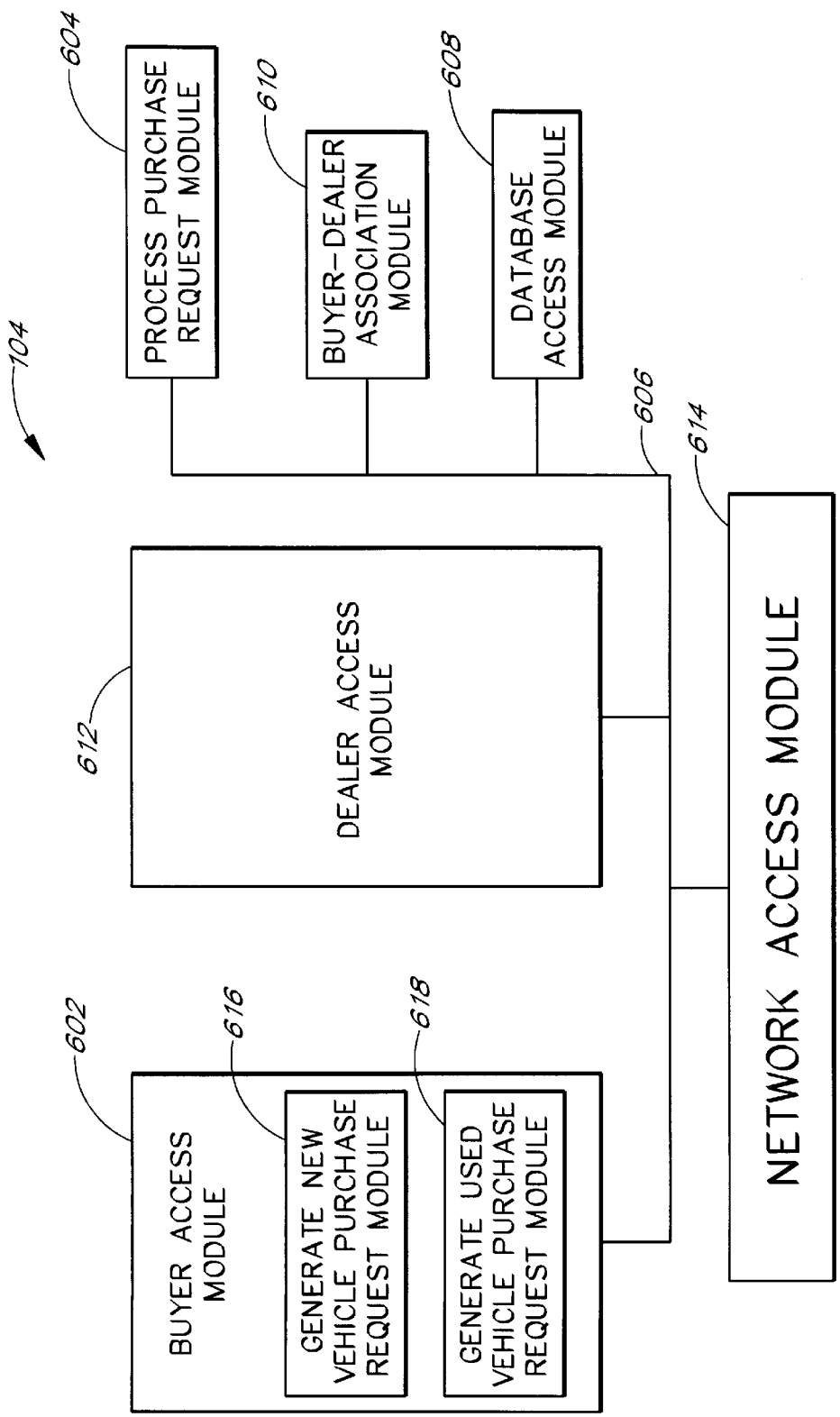
FIG. 6 is a high level block diagram illustrating one embodiment of a Data Center server system architecture of the invention.

FIG. 6 illustrates in more detail selected components of the Data Center server 104 of FIG. 1 suitable to implement one embodiment of the present invention. The Data Center server 104 includes a buyer access module 602 connected along a virtual communications path 606 to a process purchase request module 604. Also connected to the virtual communications path 606 is a database access module 608, a buyer-dealer association module 610, a dealer access module 612, and a network access module 614.

The buyer access module 602 provides a buyer an interface into the Data Center system. In one embodiment, a purchase request entry system comprises the buyer access module 602 and may facilitate a data entry environment for a buyer to enter a purchase request for a requested vehicle into the Data Center system. The buyer access module 602 may be comprised of a generate new vehicle purchase request module 616 and a generate used vehicle purchase request module 618. The generate new vehicle purchase request module 616 and the generate used vehicle purchase request module 618 may advantageously be implemented as a plurality of web pages.

Figure 15:
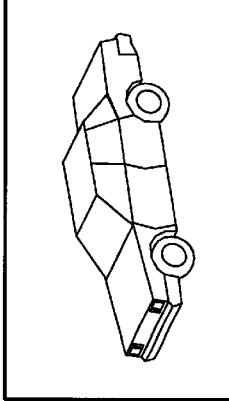
FIG. 15 is a representation of another embodiment of a web page containing a hypertext link.

In one embodiment, the web pages may advantageously be implemented in hypertext or hypermedia. Thus, the web pages may contain one or a plurality of selectable items or links. The links may provide access to other web pages contained in the Data Center system. The plurality of linked web pages guides the user in entering the necessary data to create and submit either a new vehicle purchase request or a used vehicle purchase request. In one example, FIG. 14 generally illustrates an example of a used vehicle search request for an Acura 3.5RL. Clicking on a hypertext link 1402 using a pointing device such as a mouse, or the like, may advantageously display another web page as generally illustrated by FIG. 15. Generally depicted at 1502 is the contents of the web page pointed to by the hypertext link 1402.

In another embodiment, the links may provide access to any location in the World Wide Web. For example, a link may exist to third-party web sites which advantageously provide additional product information.

The generate new vehicle purchase request module 616 facilitates a new vehicle purchase request creation and submission process. A potential buyer remotely utilizes over a network, such as the World Wide Web, at least a first web page in the generate new vehicle purchase request module 616 and provides information from which the process purchase request module 604 creates a new vehicle purchase request. Likewise, the generate used vehicle purchase request module 618 facilitates a used vehicle purchase request creation and submission process through its web pages. There may be a one-to-one correlation between a purchase request and a purchase request record.

In one embodiment, a processing system comprises the process purchase request module 604 and may facilitate the creation of a purchase request record. The process purchase request module 604 may create either a new vehicle purchase request record or a used vehicle purchase request record. The new vehicle purchase request record may be created from the information supplied through the plurality of web pages utilized during the new vehicle purchase request creation and submission process. In one embodiment, the buyer information gathered through the plurality of web pages comprising the generate new purchase request module 616 is input to the process purchase request module 604. The process purchase request module 604 creates a new vehicle purchase request record from this information. The used vehicle purchase request record may likewise be created from the information supplied through the plurality of web pages utilized during the used vehicle purchase request creation and submission process. In another embodiment, the purchase request information may also be obtained from web pages external to the Data Center system.

As one example, FIG. 16 generally illustrates one web page which may be used in the new vehicle purchase request creation and submission process. The buyer information specified in the desired vehicle model 1602 may advantageously be input to an appropriate vehicle model field 710 in an new vehicle purchase request record illustrated in FIG. 7. The new vehicle purchase request record will be further discussed below.

Figure 7:
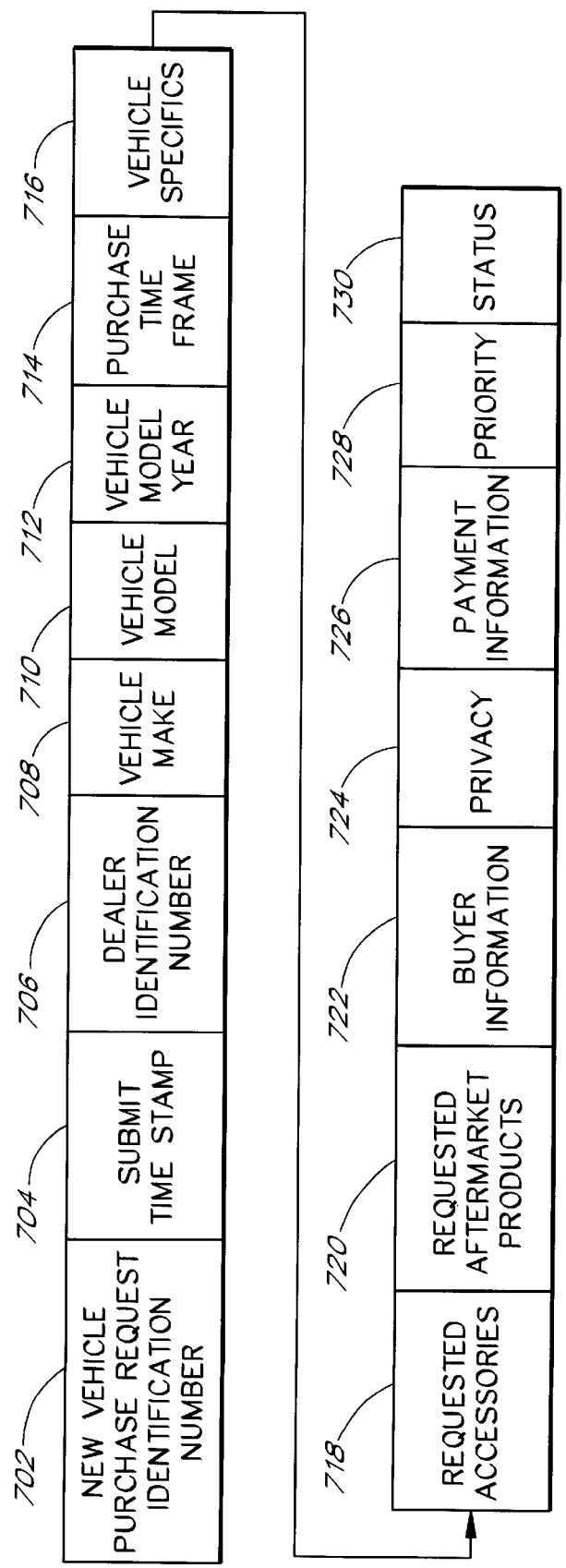
FIG. 7 is a representation of one embodiment of a new vehicle purchase request record of the invention.

FIG. 7 illustrates a set of information fields comprising a new vehicle purchase request record according to one embodiment of the invention. Fifteen fields are illustrated comprising new vehicle purchase request identification number 702, submit time stamp 704, dealer identification number 706, vehicle make 708, vehicle model 710, vehicle model year 712, purchase time frame 714, vehicle specifics 716, requested accessories 718, requested aftermarket products 720, buyer information 722, privacy 724, payment information 726, priority 728, and status 730. It should be understood that some of these fields include several sub-fields. Thus, for example, the buyer information field may include sub-fields for name, address, zip code, e-mail address, phone numbers, and contact preference. The new vehicle purchase request record may advantageously be stored in the Data Center storage medium 106.

In one embodiment, the information fields may be implemented as pointers to other fields or other records containing the information. For example, the buyer information may be implemented as a pointer. The pointer may point to a record comprised of, for example, the name, address, zip code, e-mail address, phone numbers, and contact preference. Those of ordinary skill in the art will realize that any combination of the information fields may be implemented as pointers.

In another embodiment, certain information fields may be implemented as encoded fields. For example, the requested accessories field may be implemented as a binary encoded field. Each bit position may coincide with a vehicle accessory such as an AM/FM radio, power windows, tilt wheel, overhead console, and the like. For example, a "1" in the first bit position may indicate the selection of an AM/FM Radio accessory.

Figure 8:
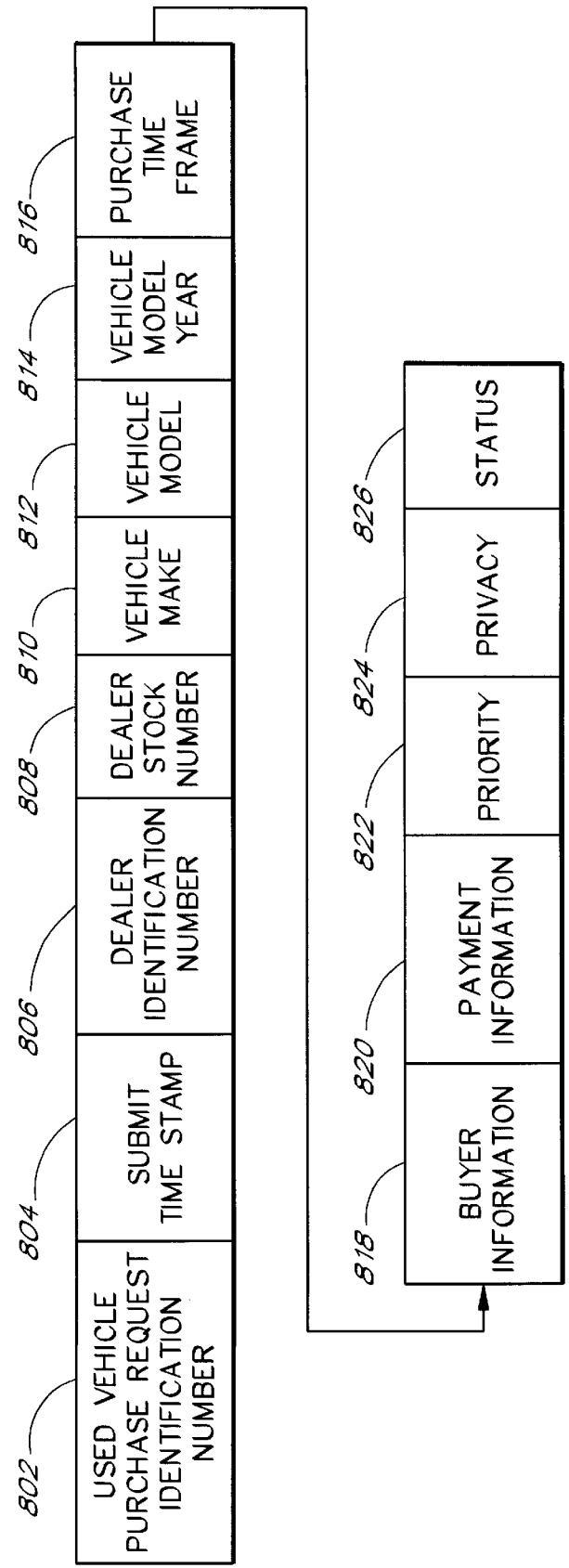
FIG. 8 is a representation of one embodiment of a used vehicle purchase request record of the invention.

FIG. 8 illustrates a used vehicle purchase request record suitable for use with one embodiment of the invention. Thirteen fields are illustrated comprising used vehicle purchase request identification number 802, submit time stamp 804, dealer identification number 806, dealer stock number 808, vehicle make 810, vehicle model 812, vehicle model year 814, purchase time frame 816, buyer information 818, payment information 820, priority 822, privacy 824, and status 826. One of ordinary skill in the art will realize that any number of the fields may be broken down into additional sub-fields. Furthermore, similar to the new vehicle purchase request record, any of the fields may be implemented as pointers, encoded fields, and the like. The used vehicle purchase request record may advantageously be stored in the Data Center storage medium 106.

In one embodiment, the process purchase request module 604 (FIG. 6) may associate the information entered by the buyer through either the generate new vehicle purchase request module 616 or the generate used vehicle purchase request module 618 with their appropriate fields in the respective purchase request record. The process purchase request module 604 may utilize the database access module 608 in storing the purchase request record in the Data Center storage medium 106 (FIG. 1). The database access module 608 will be further discussed below.

In one embodiment, the purchase request record may be completed before being stored in the Data Center storage medium 106. In another embodiment, the purchase request record fields may be stored in the Data Center storage medium 106 as the appropriate information is provided by the buyer.

In another embodiment of the invention, certain fields comprising the purchase request record may be determined by modules other than the process purchase request module 604 (FIG. 6). For example, the process purchase request module 604 may request the buyer-dealer association module 610 to identify an appropriate dealer to receive the purchase request. Accordingly, the process purchase request module 604 may advantageously pass certain purchase request information to the buyer-dealer association module 610 via the virtual communications path 606.

In one example, for a new vehicle purchase request, the buyer-dealer association module 610 may utilize the exclusive dealer regions record to determine a dealer identification number for the purchase request record. In one embodiment, as previously stated, the vehicle make and the buyer zip code may be used to determine the appropriate dealer to receive the new vehicle purchase request. The virtual communications path 606 and the buyer-dealer association module 610 will be further discussed below. In another embodiment, the dealer identification number may be passed to the process purchase request module 604 for inclusion into the dealer identification number field in the new vehicle purchase request record.

In an alternative embodiment, the exclusive dealer regions record may identify one or a plurality of dealer identification numbers. The buyer-dealer association module 610 may then create the necessary number of purchase request records, one for each of the plurality of dealer identification numbers. The dealer identification numbers may be passed to the process purchase request module 610, which may then create the necessary number of purchase request records. Thus, one or a plurality of dealers may be identified to receive a purchase request.

In one embodiment, the buyer-dealer association module 610 may advantageously determine a dealer of a used vehicle. For example, given the vehicle make, the vehicle model, and the vehicle information, the buyer-dealer association module 610 may search the used vehicle inventory to locate a vehicle matching the buyer's requirements. The used vehicle records in the used vehicle inventory may be searched to determine, for example, the dealer identification number and the dealer stock number for inclusion into the used vehicle purchase request record.

In another embodiment, the used vehicle record may also include a unique identification number. The identification number may be created by the Data Center system to identify each vehicle in the Data Center system. This identification number may advantageously be independent of the dealer stock number. This is because the stock number used by one dealer for one vehicle may be identical or very similar to a stock number selected by another dealer for another vehicle. In one embodiment, a record may associate the unique identification number to a dealer offering the vehicle for sale. The buyer-dealer association module 610 may determine the necessary information to identify the dealer, as well as the vehicle, from the identification number.

In yet another embodiment, the dealer identification number and the dealer stock number may be included into the used vehicle purchase request record by the process purchase request module 604. For example, the dealer identification number and the dealer stock number may be accessed by the process purchase request module 604 at the time the buyer requests the vehicle, or soon thereafter. The process purchase request module 604 may at that time, or soon thereafter, search the used vehicle records stored in the Data Center storage medium 106 to obtain the necessary vehicle information.

In an alternative embodiment, the buyer may specify one or a plurality of dealers to receive the purchase request. For example, the buyer may simply specify one or a plurality of dealers to receive the purchase request. In another embodiment, the buyer may specify a geographic region and a vehicle description. The Data Center system may then identify the dealers offering for sale vehicles potentially matching the specified vehicle description in the specified geographic region. Then, every identified dealer may receive the purchase request.

According to one embodiment of the present invention, the process purchase request module 604 may further associate the purchase request record with the appropriate dealer record. For example, a new vehicle purchase request record mall, upon creation, or soon thereafter, be logically connected to the dealer record new vehicle purchase requests field 310. The logical connection may be in the form of, for example, a direct entry of the new vehicle purchase request record into the new vehicle purchase requests field, or an entry into a list of new vehicle purchase request records pointed to by the new vehicle purchase requests field. The same association may be made between a used vehicle purchase request record and the dealer record used vehicle purchase requests field 312.

Figure 9:
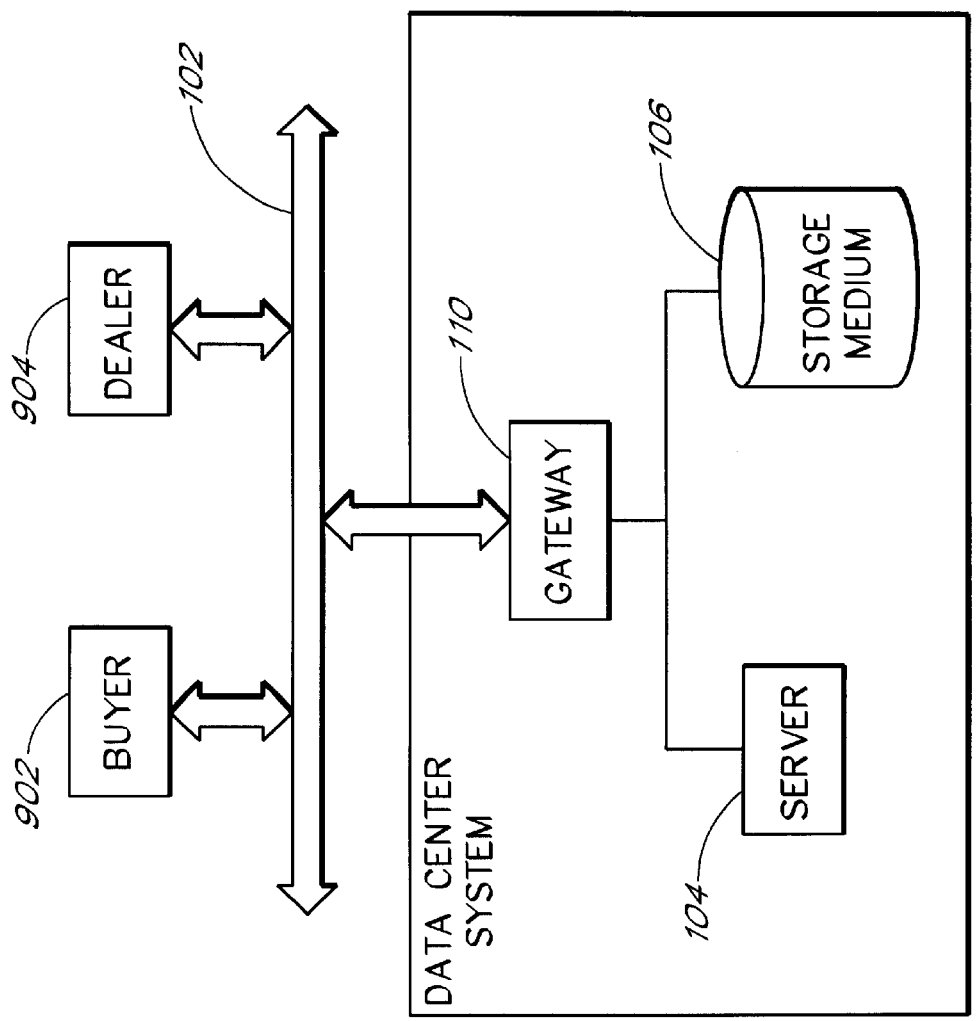
FIG. 9 is a block diagram illustrating one embodiment of a communication between a buyer, a seller, and components of a Data Center system.

FIG. 9 is a block diagram illustrating one embodiment of a communication between a buyer 902, a dealer 904, and components of the Data Center system. More particularly, a communication between the buyer 902, the dealer 904, a Data Center server 104, and a Data Center storage medium 106 is illustrated. The buyer 902 may access the Data Center server 104, through the network 102 and the gateway 110, to create and submit a purchase request in the Data Center system. The Data Center server 104 creates and stores the purchase request, as a purchase request record, in the Data Center storage medium 106. The purchase request is stored such that the dealer 904 may identify the purchase request at the time the purchase request record is created, or soon after.

Figure 17:
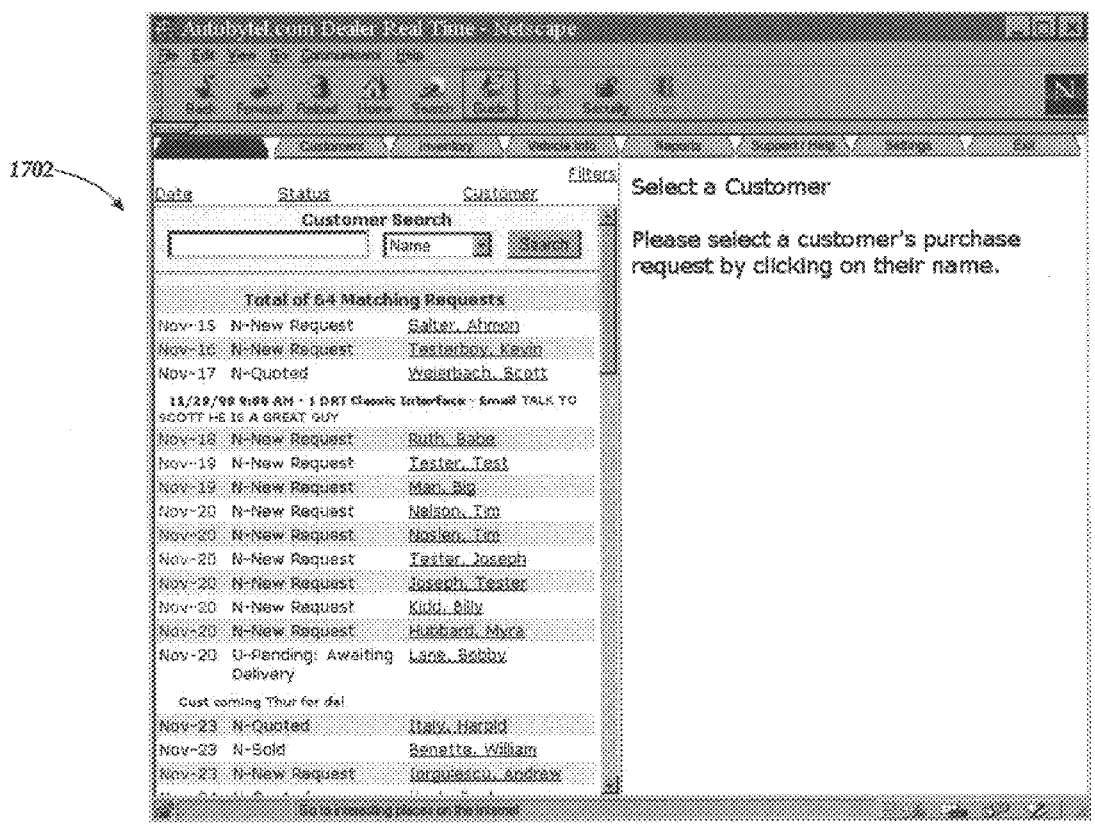
FIG. 17 is a representation of one embodiment of an HTML page illustrating a scrollable list of purchase requests implemented as links.

In one embodiment, the buyer 902 utilizes the components of the Data Center server 104 to create and store a purchase request record in the dealer's exclusive database region in the Data Center storage medium 106. The purchase request record is stored immediately upon the completion of the purchase request creation and submission process. The dealer 904 may access its database region to obtain a listing of its purchase requests. FIG. 17 generally illustrates a HTML page suitable for use in an embodiment of the invention. A scrollable list of purchase requests, advantageously implemented as links, is displayed generally at 1702. Immediately upon the creation of the purchase request record in the dealer 904 exclusive database region, the list of purchase requests is updated to show the just created purchase request.

The dealer 904 may access the Data Center system through the network 102 and the gateway 110. The dealer 904 remotely accesses the Data Center system over the network 102 by providing a URL to identify the Data Center system. Dealers advantageously access the Data Center by providing a URL and preferably not over the world wide web. Thus, access to the Data Center system may advantageously be restricted to those who know the URL and is not as readily reachable by web search engines. Thus, the URL for the buyer to access the system is advantageously HTTP://www.autobytel.com and the URL for the Dealer site, called Dealer RealTime (or DRT), may advantageously be HTTP://drt.autobytel.com.

The dealer 904 may access its dealer record and, more particularly, its purchase request records, through the Data Center Server 104. In one embodiment, the appropriate dealer record field contains information from which the purchase request records may be identified and accessed. Alternatively, the purchase request records may contain information identifying the dealer 904. Thus, the purchase request is delivered and communicated to the dealer in real time, upon the creation of the purchase request record, or soon after.

In one embodiment, a dealer may be notified of a newly created purchase request record upon accessing the Data Center system. In another embodiment, the dealer may be notified of a purchase request created while the dealer is concurrently accessing the Data Center system. For example, the dealer may be viewing a screen displaying a list of purchase requests as illustrated in FIG. 17. The appropriate field in the dealer record may be updated to identify the newly created purchase request while the dealer is accessing the Data Center system through a computer 120. Then, the screen may advantageously be refreshed to display a list containing the newly created purchase request immediately upon the creation of the purchase request record, thereby communicating to the dealer the purchase request. In yet another embodiment, the dealer may immediately be notified of a new purchase request via communication mechanisms such as e-mail, page, telephone message, or the like, which are triggered in response to the receipt of the purchase request in the dealer record.

Conventional purchase request delivery systems utilize some degree of batch processing before a purchase request notification is generated. In conventional systems, the delivery is generally by fax, phone call, or e-mail, and the notification occurs at a time significantly after the submission of the purchase request. In contrast, this invention advantageously provides for a real time delivery of a purchase request to the appropriate dealer. The purchase request delivery and notification occur when the purchase request record is created, or soon after. Moreover, unlike conventional notification systems, the buyer need not specify a recipient dealer. This contemplate, however, that the system may permit the buyer to select a recipient dealer or dealers.

The virtual communications path 606 (FIG. 6) facilitates communication amongst the modules comprising the Data Center server 104 (FIG. 1). The virtual communications path 606 may be implemented as a procedure or a function call interface. In an alternative embodiment, the virtual communications path 606 may be implemented as an interprocess communication method. For example, the modules comprising the Data Center server 104 may be implemented as one or a plurality of software processes. The various software processes may then communicate with one another by means of interprocess communication. Those of ordinary skill in the art will realize that the modules comprising the Data Center server 104 may be distributed amongst a plurality of Data Center servers 104 utilizing well known distributed technology techniques.

The database access module 608 provides an interface to the information stored on the Data Center storage medium 106. The database access module 608 thus enables the Data Center server 104 modules to be implemented independent of the Data Center storage medium 106 specifics. This enables the Data Center storage medium 106 specification to be altered without impacting the various modules, other than the data base access module 608, comprising the Data Center server 104.

In one embodiment, as previously mentioned, the Data Center storage medium 106 may be configured as a SQL database. The database access module 608 implements the specifics of the SQL commands to interact with the Data Center storage medium 106. Thus, other modules comprising the Data Center server 104 may be developed independent of the SQL specifics. For example, if the Data Center storage medium 106 is re-developed as a DB2 database, only the database access module 608 needs to be updated. The other modules comprising the Data Center server 104 need not be re-developed.

The buyer-dealer association module 610 associates a purchase request and an appropriate dealer. In one embodiment, the buyer-dealer association module 610 may receive purchase request information from the process purchase request module 604 via the virtual communications path 606. The buyer-dealer association module 610 may then access the Data Center storage medium 106, utilizing the database access module 608 and the network access module 614, to determine the appropriate dealer for the purchase request. In one embodiment, as previously stated, the buyer-dealer association module 610 may advantageously determine an appropriate dealer to receive the purchase request from the vehicle make and the buyer zip code.

Figure 10:
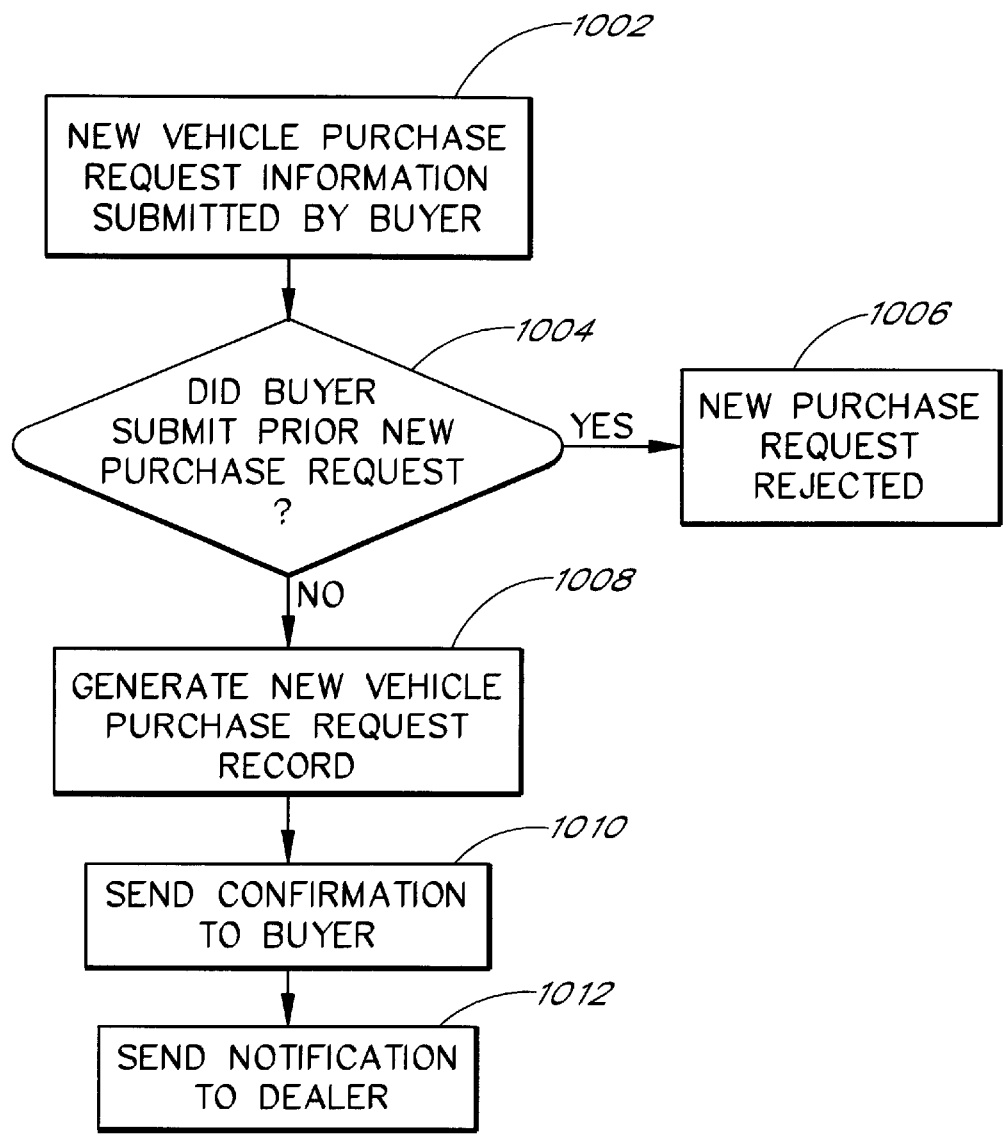
FIG. 10 is a flow chart illustrating a real time new vehicle purchase request submission and delivery process in accordance with one embodiment of the invention.

FIG. 10 is a flow chart generally illustrating a real time new vehicle purchase request submission and communication process according to one embodiment of the present invention. In particular, at a step 1002, the new vehicle purchase request information is submitted by the buyer. The buyer may utilize the generate new vehicle purchase request module 614 to submit the information pertaining to the new vehicle purchase request. In one embodiment, the buyer information may be passed to the process purchase request module 604 as the buyer information is entered through each web page, or soon thereafter. In another embodiment, the buyer-dealer association module 610 determines the appropriate dealer from the record of exclusive dealer regions once the buyer enters a requested vehicle model and a buyer zip code, or soon thereafter.

Once the buyer information is entered, the Data Center system moves to a step 1004 wherein a check is performed to determine if the buyer has previously submitted a new vehicle purchase request within the previous 48 hours. In one embodiment, a list of new vehicle purchase request records may be searched to determine if the buyer has previously submitted a new vehicle purchase request. In another embodiment, the list of new vehicle purchase request records may be sorted based on the submit time stamp. Thus, only the new vehicle purchase request records submitted within 48 hours need to be searched. In yet another embodiment, the list of new vehicle purchase request records may further be sorted according to dealer identification number, thus requiring a search of even a smaller number of new vehicle purchase request records.

In one embodiment, in step 1004, a buyer address may be used as the criteria for determining if the buyer previously submitted a new vehicle purchase request within the past 48 hours. If the buyer previously submitted a new vehicle purchase request, then the Data Center system moves to step 1006 and rejects the present new vehicle purchase request. Also, the buyer may be presented with an error message indicating the rejection of the newly submitted purchase request.

If the buyer has not submitted a new vehicle purchase request within the prior 48 hours, the Data Center system moves to a step 1008 wherein a new vehicle purchase request record is created by the process purchase request module 604 and is stored in the appropriate dealer's exclusive database region in the Data Center storage medium 106. In one embodiment, the process purchase request module 604 may generate a unique number to identify the new vehicle purchase request record. Thus unique number may be associated with the new vehicle purchase request identification number field 702 illustrated in FIG. 7. The Data Center system then moves to step 1010 wherein a confirmation is sent to the buyer. For example, the confirmation may be a web page displaying the purchase request number.

At a step 1012, the new vehicle purchase request record is added to the appropriate dealer record new vehicle purchase requests field 310. In one embodiment, as generally illustrated in FIG. 13, the new vehicle purchase requests field 310 may point to a list of new vehicle purchase request records. The current new vehicle purchase request record may be added to the existing list of new vehicle purchase request records. The current new vehicle purchase request record is immediately displayed in the list of purchase requests as generally illustrated at 1702 in FIG. 17. In another embodiment, the dealer record new vehicle purchase requests field may additionally comprise a status flag indicating the new arrival of a newer vehicle purchase request.

In another embodiment, the dealer record advantageously comprises one or a plurality of beeper numbers to be called upon the delivery of a new vehicle purchase request. The process purchase request module 604 may result in the creation of an e-mail message including, for example, beeper number or numbers for the e-mail paging service to call, and address to an e-mail to pager service. The e-mail message may then be submitted to the e-mail paging service. The e-mail paging service may then perform the paging, or dialing, function. As is well known in the art, suitable e-mail message paging services are available from companies such as Pagenet, Skytel, and MCI.

Figure 11:
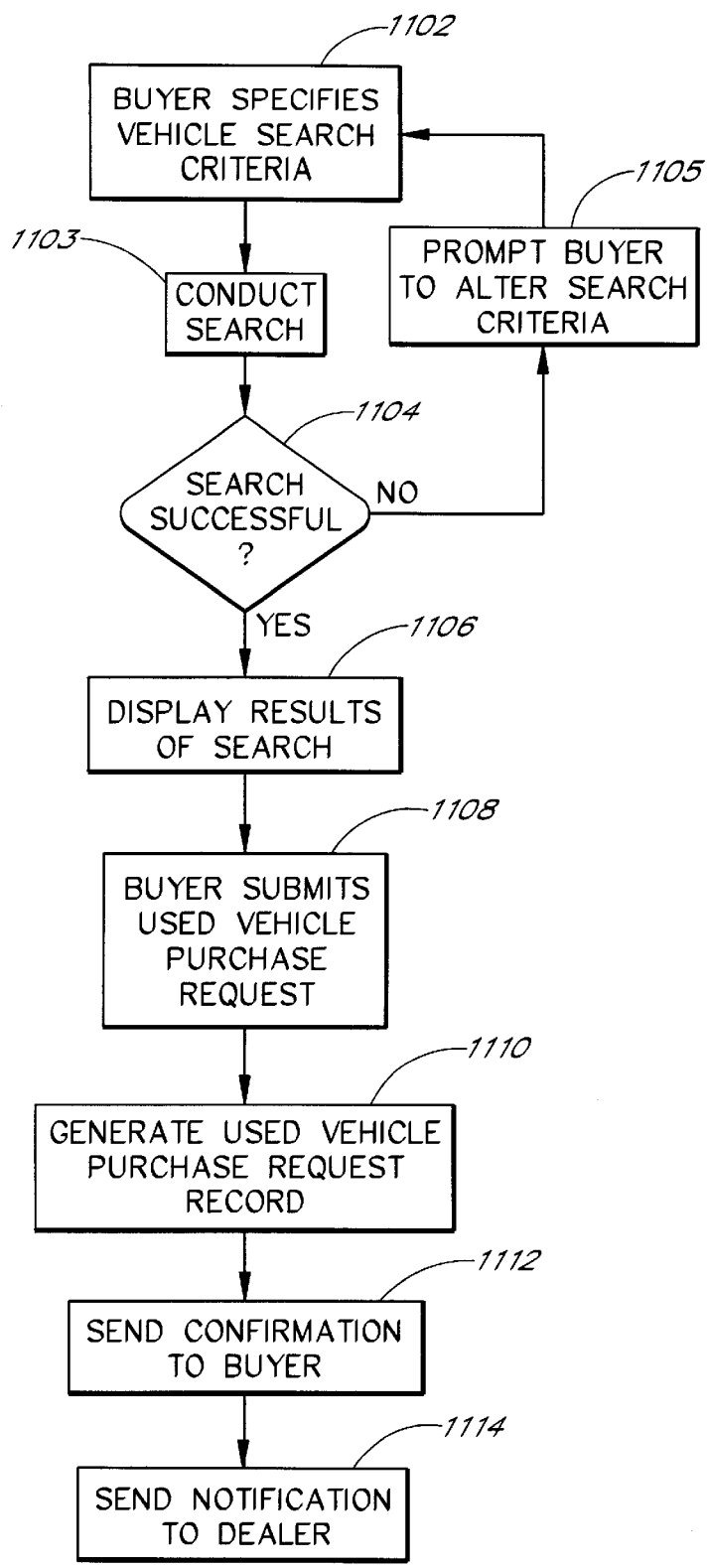
FIG. 11 is a flow chart illustrating a real time used vehicle purchase request submission and delivery process in accordance with one embodiment of the invention.

FIG. 11 is a flow chart generally illustrating a real time used vehicle purchase request submission and delivery process according to one embodiment of the invention. In particular, at a step 1102, the buyer may submit information generally describing a vehicle. To do this, the buyer uses the generate used vehicle purchase request module 616. In one embodiment, the buyer may specify information such as a vehicle make, a vehicle model, and the like.

Once the buyer submits his or her search criteria, which generally describes the vehicle, the Data Center system moves to step 1103 and conducts a search, based on the submitted search criteria, of the used vehicle records comprising the used vehicle inventory in the Data Center storage medium 106. In one embodiment, the generate used vehicle purchase request module 618 may utilize the database access module 608 to perform the search. If the search is unsuccessful at step 1104, the Data Center system moves to a step 1105 wherein the buyer is prompted to alter the search criteria. The Data Center system then moves to step 1102 and functions as described above.

In one embodiment, if it is determined in step 1104 that the search was successful, the Data Center system moves to step 1106 wherein the results of the search are displayed to the buyer. In this step, the buyer may also view a more detailed description of one or more vehicles found in the search. Having decided on an appropriate vehicle, the buyer may create a purchase request for that vehicle which is submitted to the Data Center system at a step 1108.

At a step 1110, the process purchase request module 604 creates a used vehicle purchase request record in the appropriate dealer's exclusive database region in the Data Center storage medium 106. In this step, the buyer-dealer association module 610 may determine the dealer offering the used vehicle for sale. In one embodiment the process purchase request module 604 may generate a unique number to identify the used vehicle purchase request record. This unique number may be associated with the used vehicle purchase request identification number field 802 illustrated in FIG. 8.

In one embodiment, a confirmation is sent to the buyer at a step 1112. Fir example, the confirmation sent may be a web page displaying the purchase request number. At a step 1012, the used vehicle purchase request record is stored and identified in a manner similar to a new vehicle purchase request record. Thus, the purchase request is communicated to the dealer in real time. Consequently, the dealer may appropriately act on the purchase request upon its submission, or shortly after.

The network access module 614 (FIG. 6) provides the modules of the Data Center Server 104 (FIG. 1) a uniform interface to the LAN 108. In one embodiment, the network access module 614 may be implemented as an application program interface. The network access module 614 enables the Data Center server 104 modules to be implemented independent of the underlying network specifics. Thus, the underlying network specifics may be altered without impacting the various modules, other than the network access module 614, comprising the Data Center server 104.

The dealer access module 612 provides a dealer an interface into the Data Center system. In one embodiment, a dealer management system comprises the dealer access module 612 and may facilitate the dealer's managing its purchase requests. More particularly, a dealer may directly access its exclusive database region, and the information contained therein, by logging into the Data Center system through the dealer access module 612. In one embodiment, the dealer access module 612 may be implemented as a plurality of HTML pages providing the dealer a mechanism to access its exclusive database region. The Data Center system may advantageously communicate to the dealer its purchase requests through one or a plurality of the HTML pages. An example of one such HTML page is illustrated in FIG. 17. The dealer may also advantageously perform real time operations such as, purchase request management, inventory management, and the like, through the plurality of HTML pages.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A method of communicating a purchase request to a dealer in a Data Center system having a system database, a buyer interface, and a dealer interface, wherein said buyer interface and dealer interface provide a remote interface to said Data Center, said buyer interface and dealer interface provide immediate access to said system database, said method comprising the acts of:

creating an exclusive database region for each of a plurality of participating dealers in said system database;

providing each of said plurality of dealers direct access to said exclusive database region over a computer network, wherein said access is through said dealer interface;

receiving said purchase request over a computer network from a potential buyer, said purchase request including product identification data and buyer location information;

comparing said product identification data and said buyer location information with at least one of a plurality of records that are associated with at least one of said plurality of dealers;

identifying in response to said step of comparing at least one of said plurality of dealers to notify;

creating a purchase request record for said purchase request; and communicating said purchase request to said identified dealer, said communicating includes storing said purchase request record into said exclusive database region for said identified dealer immediately upon creation of said purchase request record, and wherein said purchase request is accessed by the identified dealer via at least one web page that is provided by a server that is remote to the identified dealer.

2. The method as defined in claim 1 wherein said act of receiving said purchase request comprises receipt of a request that is transmitted through a plurality of web pages.

3. The method as defined in claim 1, wherein said product identification data includes a vehicle make and a vehicle model.

4. The method as defined in claim 1, wherein said purchase request records is either a new vehicle purchase request record or a used vehicle purchase request record.

5. The method as defined in claim 1, wherein said dealer identification is based on a vehicle make specified in said product identification data and a zip code specified in said buyer location information.

6. The method as defined in claim 1, wherein said dealer identification is based on a search of a used vehicle inventory for a vehicle specified in said product identification data.

7. The method as described in claim 6, wherein said search is further based on both a buyer search radius and a dealer search radius.

8. The method as defined in claim 1, wherein said dealer identification is based on an identification number.

9. The method as defined in claim 1, wherein said act of communicating includes the act of adding a new vehicle purchase request record to a new vehicle purchase requests field in a dealer record associated with said identified dealer.

10. The method as defined in claim 1, wherein said act of communicating includes the act of adding a used vehicle purchase request record to a used vehicle purchase requests field in a dealer record associated with said identified dealer.

11. The method as defined in claim 1, wherein said act of communicating includes the act of adding a new vehicle purchase request record to a list of new vehicle purchase request records.

12. The method as defined in claim 1, wherein said act of communicating includes the act of adding a used vehicle purchase request record to a list of used vehicle purchase request records.

13. The method as defined in claim 1, wherein said act of communicating includes the act of setting a dealer identification number field to a dealer identification number for said identified dealer.

14. The method as defined in claim 1, wherein said act of communicating includes the acts of:
   displaying a list of purchase requests to said identified dealer; and
   refreshing said list to include a new purchase request immediately upon the creation of said new purchase request.

15. The method as defined in claim 1, wherein said act of communicate includes sending an e-mail message to an e-mail message paging service.

16. The method as defined in claim 1, wherein said act of communicating includes logically connecting a new purchase request record to a dealer record.

17. The method as described in claim 1, further comprising the act of receiving only one new vehicle purchase request from said buyer within a 48 hour period.

18. A purchase request communication system, wherein said purchase request is remotely entered by a potential buyer over a computer network, said purchase request communication system comprising:
   a system database which provides an exclusive database region for each of a plurality of dealers;
   an entry system which creates said purchase request, and which provides at least a first web page to said buyer;
   a dealer management system which provides said plurality of dealers remote access into said exclusive database region via using at least a second web page; and
   a processing system which creates a purchase request record for said purchase request, said processing system identifying which of a plurality of dealers based on said purchase request, said processing system immediately storing said purchase request record in said exclusive database region for said identified dealer.

19. The purchase request communication system as defined in claim 18, wherein said purchase request record is either a new vehicle purchase request record or a used vehicle purchase request record.

20. The purchase request communication system as defined in claim 18, wherein said dealer identification is based on a vehicle make and a zip code specified in said purchase request.

21. The purchase request communication system as defined in claim 18, wherein said dealer identification is determined in response to a search of a used vehicle inventory for a vehicle specified in said purchase request.

22. The method as described in claim 21, wherein said search is further based on both a buyer search radius and a dealer search radius.

23. The purchase request communication system as defined in claim 18, wherein said dealer identification is determined in response to an evaluation of an identification number.

24. The purchase request communication system as defined in claim 18, wherein said communication system communicates said purchase request to said dealer by adding a new vehicle purchase request record to a new vehicle purchase requests field in a dealer record associated with said dealer.

25. The purchase request communication system as defined in claim 18, wherein said communication system communicates said purchase request to said dealer by adding a used vehicle purchase request record to a used vehicle purchase requests field in a dealer record associated with said dealer.

26. The purchase request communication system as defined in claim 18, wherein said communication system communicates said purchase request to said dealer by adding a new vehicle purchase request record to a list of new vehicle purchase request records.

27. The purchase request communication system as defined in claim 18, wherein said communication system communicates said purchase request to said dealer by adding a used vehicle purchase request record to a list of used vehicle purchase request records.

28. The purchase request communication system as defined in claim 18, wherein said communication system communicates said purchase request to said dealer by setting a dealer identification number field to a dealer identification number for said identified dealer.

29. The purchase request communication system as defined in claim 18, wherein said communication system communicates said purchase request to said dealer by sending an e-mail message to an e-mail message paging service.

30. A purchase request communication system for communicating to at least one of a plurality of dealers a purchase request submitted by a potential buyer, said communication system having a system database, a buyer interface, and a dealer interface, said system database including an exclusive database region for each of said plurality of dealers, said communication system comprising:
   means for receiving a purchase request over a computer network from a potential buyer, said purchase request including at least a product identification data and a buyer location information;
   means for comparing said product identification data and said buyer location information with at least one of a plurality of records that are associated with at least one of said plurality of dealers;
   means for identifying in response to said comparing means at least one of said dealers to notify;
   means for creating a purchase request record for said purchase request; and
   means for communicating said purchase request to said identified dealer, said communicating includes storing said purchase request record into said exclusive database region for said identified dealer immediately upon said formulating said purchase request record, and wherein said purchase request is accessed by the identified dealer via at least one web page that is provided by a server that is remote to the identified dealer.

31. The communication system as defined in claim 30, additionally comprising:
   means for displaying a list of purchase requests to said identified dealer; and
   means for refreshing said list to include a new purchase request immediately upon tie creation of said new purchase request.

32. The communication system as defined in claim 30, additionally comprising means for sending an e-mail message to an e-mail message paging service.

33. The communication system as defined in claim 30, wherein said dealer identification is based on both a buyer provided search radius and a dealer provided search radius.

* * * * *

UNITED STATES PATENT AND TRADEMARK OFFICE
CERTIFICATE OF CORRECTION

PATENT NO.     : 6,282,517 B1                                           Page 1 of 1
DATED          : August 28, 2001
INVENTOR(S)    : Don P. Wolfe, Douglas S. Nottage, Kevin J. Wagoner and Tim E. Nelson It is certified that error appears in the above-identified patent and that said Letters Patent is hereby corrected as shown below:

<u>Title page,</u>
Inventors, please remove the word "Waggoner" and replace therefor -- Wagoner --.

Signed and Sealed this

Twelfth Day of March, 2002

Attest:

JAMES E. ROGAN
*Attesting Officer*    *Director of the United States Patent and Trademark Office*

UNITED STATES PATENT AND TRADEMARK OFFICE
CERTIFICATE OF CORRECTION

PATENT NO. : 6,282,517 B1
DATED : August 28, 2001
INVENTOR(S) : Don P. Wolfe et al.

It is certified that error appears in the above-identified patent and that said Letters Patent is hereby corrected as shown below:

Column 18,
Line 37, please delete the word "records" and replace therefor -- record --

Column 19,
Line 13, please delete the word "communicate" and replace therefor
-- communicating --

Column 20,
Line 57, please delete the word "tie" and replace therefore -- the --.

Signed and Sealed this

Twenty-eighth Day of September, 2004

JON W. DUDAS
*Director of the United States Patent and Trademark Office*